United States Patent [19]
Lin

[11] Patent Number: 5,916,686
[45] Date of Patent: *Jun. 29, 1999

[54] SILOXANE ORGANIC HYBRID POLYMER CATALYST

[75] Inventor: Chia-Cheng Lin, Gibsonia, Pa.

[73] Assignee: PPG Industries, Inc., Pittsburgh, Pa.

[*] Notice: This patent is subject to a terminal disclaimer.

[21] Appl. No.: 07/546,069

[22] Filed: Jun. 29, 1990

[51] Int. Cl.⁶ .................................................. B32B 9/04
[52] U.S. Cl. ........................... 428/447; 428/412; 428/451
[58] Field of Search .................................. 428/447, 412, 428/451

[56] References Cited

U.S. PATENT DOCUMENTS

| | | | |
|---|---|---|---|
| 4,405,679 | 9/1983 | Fujioka et al. | 428/216 |
| 4,500,669 | 2/1985 | Ashlock et al. | 524/440 |
| 4,571,365 | 2/1986 | Ashlock et al. | 428/412 |
| 4,799,963 | 1/1989 | Basil et al. | 106/287.13 |

FOREIGN PATENT DOCUMENTS 49-003932  1/1974  Japan.

OTHER PUBLICATIONS

*Journal of Non–Crystalline Solids,* vol. 63 (1984) Philipp et al.

Primary Examiner—Paul J. Thibodeau
Assistant Examiner—R. Follett
Attorney, Agent, or Firm—Donna L. Seidel

[57] ABSTRACT

Siloxane organic hybrid polymers and a method of making them by condensation polymerization reaction of organoalkoxysilane with an alkali metal carboxylic acid catalyst in the presence of organic film-forming polymers are disclosed.

14 Claims, No Drawings

SILOXANE ORGANIC HYBRID POLYMER CATALYST

FIELD OF THE INVENTION

The present invention relates generally to the art of hydrolytic condensation polymers of organoalkoxysilanes, and also to the art of siloxane organic hybrid polymers.

BACKGROUND OF THE INVENTION

U.S. Pat. No. 4,405,679 to Fujioka et al. discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. Nos. 4,500,669 and 4,571,365 to Ashlock et al. disclose transparent, abrasion-resistant coating compositions comprising a colloidal dispersion of a water-insoluble dispersant in a water-alcohol solution of the partial condensate of silanol wherein the dispersant comprises metals, alloys, salts, oxides and hydroxides thereof.

In the *Journal of Non-Crystalline Solids*, Vol. 63, (1984), Philipp et al. disclose in "New Material for Contact Lenses Prepared From Si- and Ti-Alkoxides by the Sol-Gel Process" that it is possible to combine inorganic and organic elements to develop materials with special properties.

U.S. application Ser. No. 914,859 filed Oct. 3, 1986, by Lin, now U.S. Pat. No. 5,277,867, discloses organic-inorganic hybrid polymers prepared by polymerizing an organic monomer in the presence of an inorganic oxide sol comprising an organoalkoxysilane having an organic functional group capable of reacting with said organic monomer.

U.S. application Ser. No. 07/133,831 by Basil et al., filed Dec. 16, 1987, now abandoned combines the mechanical strength and stability of inorganic materials with the flexibility and film-forming ability of organic materials. Organic-inorganic hybrid polymers in accordance with the present invention are prepared by hydrolytic condensation polymerization of an organoalkoxysilane in the presence of an organic polymer such as polyvinylpyrrolidone.

SUMMARY OF THE INVENTION

To combine the mechanical strength and stability of inorganic materials with the flexibility and film-forming ability of organic materials is an objective of this invention. Organic-inorganic hybrid polymers in accordance with the present invention are prepared by hydrolytic condensation polymerization of an organoalkoxysilane in the presence of an organic polymer such as polyvinylpyrrolidone with an alkali metal carboxylic acid used as the condensation catalyst.

DESCRIPTION OF THE PREFERRED EMBODIMENTS

Commercial abrasion-resistant coatings for stretched acrylic either contain colloidal silica and exhibit poor resistance to corrosion by solvents such as acetone and sulfuric acid, or are based on relatively soft organic polymer systems such as urethanes or melamines.

The hydrolysis of silanes such as alkyltrialkoxysilanes or aryltrialkoxysilanes with dialkyldialkoxysilanes is preferably carried out in an alcohol-water solution of a film-forming organic polymer. Preferred silanes of the general formula $R_xSi(OR')_{4-x}$, wherein R is an organic radical, preferably alkyl or acrylic-functional, R' is a hydrolyzable low molecular weight alkyl group, preferably methyl, ethyl, propyl or butyl, and x is at least one and less than 4, include methyltrimethoxysilane and dimethyldiethoxysilane. Hydrolysis and condensation are carried out under controlled conditions in the presence of appropriate additives to produce stable, clear solutions that exhibit excellent adhesion to unprimed stretched or cast acrylic or polycarbonate. An alkali metal carboxylic acid is preferably used as the condensation catalyst. The proper amount of catalyst and degree of hydrolysis and condensation of the solution are key factors affecting adhesion of the cured coating to a primed polycarbonate substrate. Cured coatings, preferably about four microns thick, typically exhibit Bayer abrasion results (i.e., percent haze after 300 cycles of one kilogram load) of 5–10 percent, have a stress crazing time of 17 minutes upon exposure to acetone and 30 minutes upon exposure to 75% sulfuric acid under 3000 pounds per square inch pressure, and remain crack-free for up to 1900 hours of ultraviolet radiation exposure.

Preferably, the silane hydrolytic polycondensation is catalyzed by an alkali metal carboxylic acid which is volatile and which does not lower the pH of the solution excessively. Preferred catalysts include sodium acetate and a preferred pH is about 5. The temperature of the hydrolytic polycondensation reaction may be controlled either by external cooling, or by adjusting the solvent and acid composition to control the reaction rate, preferably not to exceed 45° C. A catalyst, preferably sodium acetate, is added to promote complete cure of the siloxane polymer at temperatures preferably in the range of 80° C. A high molecular weight organic polymer, preferably polyvinylpyrrolidone having a molecular weight of at least 300,000, is added for optimum film formation. Acrylic or primed polycarbonate samples are preferably coated by dip coating, dried in air at ambient temperature for about 30 minutes and cured at 80° C. for about 2 hours.

The coated sample is subjected to standard Bayer abrasion testing for 300 cycles, and QUV-B exposure alternating 8 hours of ultraviolet irradiation at 60° C. and 4 hours at 45° C. and 100 percent relative humidity without ultraviolet irradiation. The above invention will be further understood from the description in the specific example which follows.

EXAMPLE I

A solution is prepared comprising 3.0 grams of polyvinylpyrrolidone dissolved in a solvent comprising 50 grams of water, 50 grams of methanol and 2 grams of formaldehyde (37% solution). The polyvinylpyrrolidone has a molecular weight of about 630,000 and is commercially available as K-90 from GAF Corp. A mixture of siloxanes comprising 80 grams of methyltrimethoxysilane and 8 grams of dimethyldiethoxysilane is added to the polyvinylpyrrolidone solution at room temperature. After stirring the reaction mixture for two hours, 50 grams of isobutanol and 0.1 gram of sodium acetate trihydrate are added. After further stirring, the sol is filtered and applied to either stretched acrylic or cast acrylic by dip coating for five minutes at room temperature. No pretreatment of the acrylic surface is necessary. The coating is dried in air at ambient temperature for 30 minutes and cured at 80° C. for 2 hours. After 300 cycles of Bayer abrasion testing, the coated acrylic exhibits good adhesion and only 16.2 percent haze, compared with 50 percent haze for uncoated acrylic after the same abrasion testing.

The above example is offered to illustrate the present invention. The composition and concentration of the silane, constitution of the alcohol diluent, concentration and type of the alkali metal carboxylic acid catalyst, water content, organic polymer and proportion, and other reaction conditions may be varied in accordance with the present invention. The abrasion resistant siloxane organic hybrid polymer coating of the present invention may be used on other substrates. The scope of the present invention is defined by the following claims.

I claim:

1. An abrasion resistant coated plastic transparency comprising a rigid transparent plastic substrate; and a siloxane organic hybrid polymer coating wherein said coating comprises the reaction product of:
   a. an organoalkoxysilane of the general formula $R_xSi(OR')_{4-x}$ wherein R is an organic radical, R' is an alkyl group selected from the group consisting of methyl, ethyl, propyl and butyl, and x is at least one and less than 4;
   b. an alkali metal carboxylic acid catalyst; and
   c. polyvinyl pyrrolidone.

2. An article according to claim 1, wherein said catalyst is sodium acetate.

3. An article according to claim 2, wherein the rigid transparent plastic substrate is selected from the group consisting of acrylic and polycarbonate.

4. An article according to claim 2, wherein R' is selected from the group consisting of methyl and ethyl.

5. An article according to claim 2, wherein R is selected from the group consisting of alkyl and acrylic-functional groups.

6. An article according to claim 2, wherein said organic polymer is polyvinylpyrrolidone.

7. An article according to claim 6, wherein the ratio of silane to polyvinylpyrrolidone is about 30.

8. An article according to claim 3, wherein the rigid transparent plastic substrate is selected from the group consisting of stretched and cast acrylic.

9. An article according to claim 1, wherein said coating is about 4 microns thick.

10. An article according to claim 1, wherein after a Bayer abrasion test is conducted on said coated plastic transparency, said coated plastic transparency exhibits a percent haze of about 5 to 10 percent, said Bayer abrasion test including 300 cycles of a one kilogram load.

11. An article according to claim 1, wherein after said coated plastic transparency is exposed to acetone under 3000 pounds per square inch pressure said has a stress crazing time of 17 minutes.

12. An article according to claim 1, wherein after said coated plastic transparency is exposed to 75% sulfuric acid under 3000 pounds per square inch pressure, said coating has a stress crazing time of 30 minutes.

13. An article according to claim 1, wherein after a QUV-B ultraviolet radiation exposure test is conducted on said coated plastic transparency, said coating remains crack-free for up to 1900 hours, said QUV-B ultraviolet radiation exposure test including alternating 8 hours of ultraviolet irradiation at 60° C. and 4 hours at 45° C. and 100% relative humidity without ultraviolet irradiation.

14. An article according to claim 2, wherein said catalyst is sodium acetate trihydrate.

* * * * *

UNITED STATES PATENT AND TRADEMARK OFFICE
CERTIFICATE OF CORRECTION

PATENT NO. : 5,916,686
DATED : June 29, 1999
INVENTOR(S) : Chia-Cheng Lin

It is certified that error appears in the above-identified patent and that said Letters Patent is hereby corrected as shown below:

6. An article according to claim 2, wherein said polyvinylpyrrolidone has a molecular weight of at least 300,000.

Signed and Sealed this

Twenty-seventh Day of March, 2001

Attest:

NICHOLAS P. GODICI

Attesting Officer

Acting Director of the United States Patent and Trademark Office